United States Patent Office 3,022,765
Patented Feb. 27, 1962

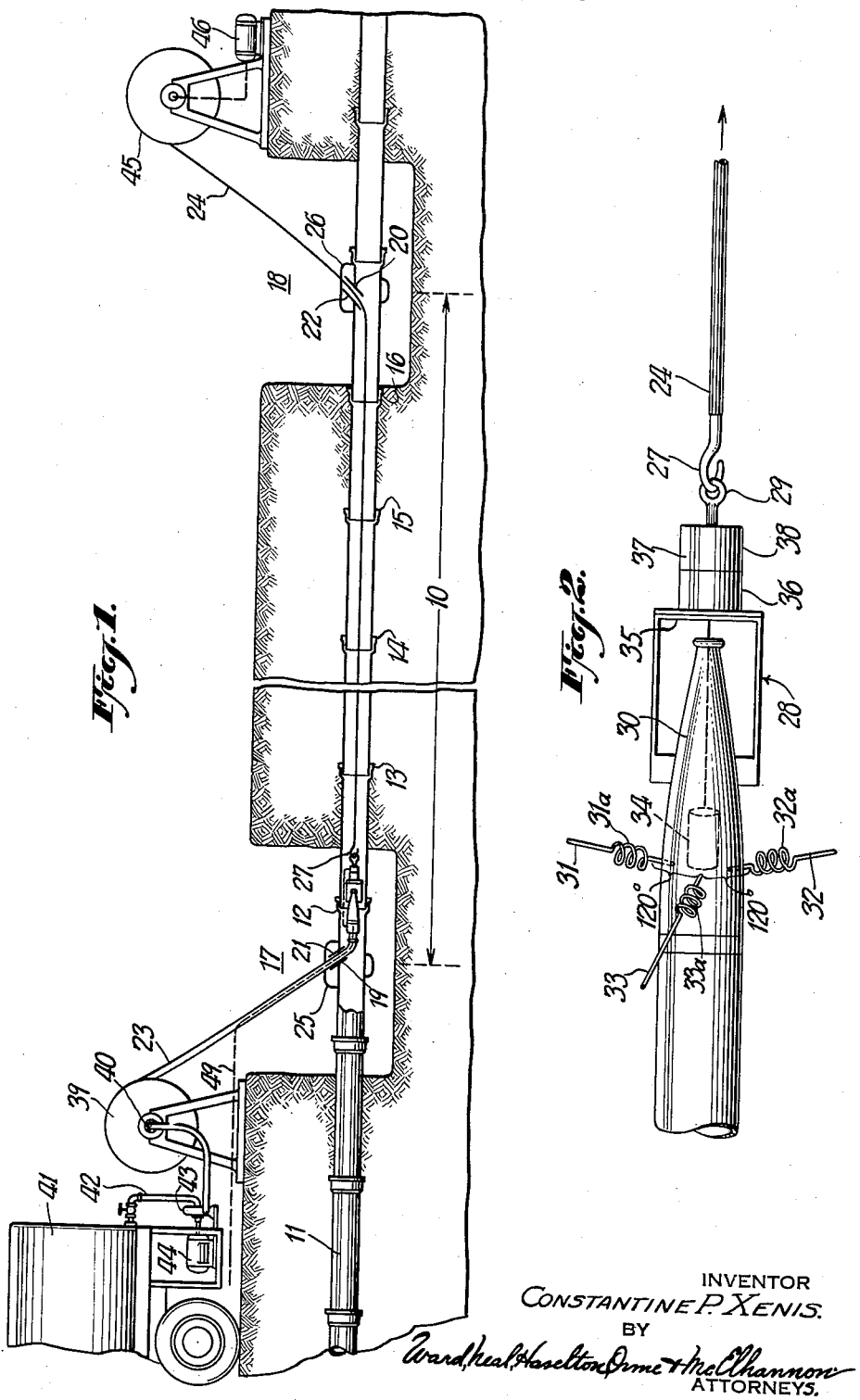
Feb. 27, 1962    C. P. XENIS    3,022,765
METHOD AND APPARATUS FOR INTERIOR COATING OF PIPES
Filed April 3, 1958
INVENTOR
CONSTANTINE P. XENIS.

3,022,765
METHOD AND APPARATUS FOR INTERIOR COATING OF PIPES
Constantine P. Xenis, Douglaston, N.Y., assignor to Consolidated Edison Company of New York, Inc., New York, N.Y., a corporation of New York
Filed Apr. 3, 1958, Ser. No. 726,195
1 Claim. (Cl. 118—2)

This invention relates to the sealing of leaking pipe joints of a pipe system, and more particularly to improvements in methods and apparatus for the inexpensive and rapid sealing in one operation of a plurality of such joints of a buried pipe system, for example, a city gas main system, and without the necessity for making excavations except those at the opposite ends of selected lengths of such pipe system undergoing the sealing method embodying this invention.

Most presently existing gas main systems, such as those employed in municipalities, were originally designed for conducting "city manufactured gas." The packings in the joints thereof have been of two main types, namely: (a) jute packing backed by an outer layer of lead, and (b) cement or grout packing with a very small amount of jute inserted in the front end of the joint to retain the grout, the expression "front end of the joint" referring to the inner portion thereof close to the gas passage. The former type of packing is for the most part employed in existing gas main systems. Many of such gas main systems have been converted to the carrying of natural gas, that is, inflammable gases such as those generally obtained from oil wells and used in certain communities as an illuminating and fuel gas. Such natural gas comprises a mixture of those hydrocarbons usually associated with natural petroleum deposits. The propane and butane constituents are usually scrubbed out of the gas prior to use.

Since natural gas is extremely dry as opposed to city manufactured gas, its use in the old gas main systems has damaging effects upon the jute packing of the joints. Thus after a period of use, which may be up to two or three years, the natural gas causes the jute to become dried out or dehydrated and thereby to become frangible and powder-like. Portions of such jute packing thus are destroyed and carried away by the natural gas in the mains.

Conventional prior art procedures for repairing such leaking joints have included the excavating of a hole at each pipe joint, the sealing of the leaking joint by special clamping and gasket devices, and the refilling of the excavation. Although such procedure does not necessitate interruption of gas flow to the customers, it is extraordinarily expensive and slow.

The present invention includes a novel method and apparatus for overcoming the aforementioned problem. In one aspect thereof it comprises a method for sealing leaks in a plurality of joints which exist in a selected length of such a buried gas main system of ferrous metal and without interrupting the flow of such gas and includes the steps of exposing opposite extremities of such selected length of gas main, introducing a source of a joint sealant (such as a sealant spray or splasher apparatus) into the interior of such main via an orifice cut in one such exposed extremity of the gas main. Such source of joint sealant is advanced through such selected length as by pulling same, this being accomplished by exerting a pulling force via an orifice formed in the other exposed extremity of the gas main thereby to move the source of joint sealant from one extremity toward the other. The movement of such source of joint sealant into the neighborhood of each joint is sensed electrically or electromagnetically while the source is being advanced as aforementioned. The joint sealant is introduced into the main in the form of a spray emanating from such source in response to the movement of the source into the neighborhood of the joint. The spray thus is directed upon the interior surfaces of the main at and adjacent to each joint in response to such sensing of the joint location. A liquid joint sealant is preferred that is capable of adhering aggressively to all surfaces and of drying in the form of a flexible, stretchable rubber-like film and of penetrating into and being absorbed to some extent by the jute. Joint sealants having these characteristics are readily available on the market.

Accordingly, it is one of the objects of the present invention to provide an improved method and apparatus for sealing leaks in joints of a buried pipe system, such method and apparatus being inexpensive, rapidly operable, highly effective and requiring a minimum of excavation and equipment, together with the aforementioned advantage of no interruption of the flow of gas in the mains.

The above and further objects and novel features will more clearly appear from the description set forth below when read in connection with the accompanying drawings. The latter comprise illustrations of a preferred form of apparatus for executing the novel method and embodying the invention, it being understood that the drawings do not define the limits of the invention, reference for this latter purpose being had to the appended claim.

In the drawings:

FIG. 1 is a schematic illustration comprising a longitudinal view of a selected length of a buried gas pipe, partly in section and with parts broken away, and showing the apparatus for carrying out the novel method embodying the invention; and FIG. 2 is a side elevation on a relatively enlarged scale of nozzle and splash plate means employed in the present invention.

Referring to FIG. 1, it is desired to seal any leaks in all of the joints in a selected length 10 of a buried gas main 11. Such selected length 10 may be, for example, 300 ft. and may include a plurality of gas main joints, such as joints 12, 13, 14, 15 and 16. The number of joints, of course, depends upon the selection of the length 10. Usually there is one joint about every twelve feet.

The opposite extremities of such selected length 10 are exposed by excavations 17 and 18, it being understood, of course, that no other excavations aer required for the sealing of the several joints of the selected length 10.

Two holes 19 and 20 are drilled in the gas main 11 at the opposite extremities of the length 10, such holes being conformed to admit at an angle of substantially 45° sleeves 21 and 22. Such sleeves are positioned in an attitude to facilitate the movement therethrough respectively of a hose 23 and a snake line 24.

In view of the fact that the carrying out of the present novel method and the employment of the novel apparatus occurs without interrupting the flow of gas in the main 11, suitable gland means are provided at the sleeves 21 and 22 for preventing the leakage of gas despite the movement of the aforementioned hose 23 and the snake line 24 through their respective sleeves 21 and 22.

Such gland means for the sleeves 21 and 22 are respectively schematically shown at 25 and 26. Each gland means, of course, is provided with an opening for permitting relative movement of the hose or the snake line, the margin of the opening being capable of hugging the hose or the pipe line to prevent the aforementioned leakage of gas.

The snake line 24 is inserted into the gas main via the gland 26 and the sleeve 22, and such line is worked up to the sleeve 21 where it can be fished out of the main by some suitable loop or hooking means, the snake line having secured to one extremity thereof a hook 27 which can engage such loop or hooking means. After the hook 27 has thus been fished out of the main it is attached to nozzle means 28 by means of an eye 29 at one extremity thereof as shown in FIG. 2.

The nozzle means 28, in an advantageous form thereof as shown in FIG. 2, comprises a tapered nozzle 30 upon which are mounted suitable means for holding the tip of the nozzle off of the floor of the main. Such means, in the form shown, comprises three bristle-like fingers 31, 32 and 33 which extend substantially radially from the nozzle 30 and which are spaced thereabout at equal angular increments of about 120°. At the base of the bristle-like fingers 31, 32 and 33 are resilient coils 31a, 32a and 33a, respectively, for the purpose of facilitating the easy bending of the bristle-like fingers in order, for example, that they may be folded down against the nozzle means thereby to facilitate the insertion and withdrawal of the nozzle means through said sleeve 21. The invention is not limited to the use of the fingers 31—33. However, they are useful in holding a reluctance sensing means (to appear later) near the pipe axis to give a more accurate measurement of reluctance.

Within the nozzle 30, in the form shown, there is provided as scshematically shown suitable valve means 34 for regulating the orifice of the nozzle and including means for opening and shutting such nozzle. A splash plate 35 is secured to the nozzle 30 in the manner shown in FIG. 2, such splash plate 35 facing the discharge orifice of the nozzle 30 at one side thereof. On the other side thereof there are mounted suitable valve control or valve moving means 36 for the valve means 34, such means 36 being operatively connected to valve 34 and also being operatively connected to an electrical device 37 which is capable of sensing a change in a selected electrical characteristic of the gas main 11 to signal the approach and presence of a pipe joint. For example, the sensing device 37 may comprise suitable electromagnetic means for sensing a change in the reluctance of the gas main. Such change in reluctance will occur because the metal of the main is discontinuous at the joint and thus the gap which is filled by a packing will produce a considerable increase in reluctance. It is, of course, understood that any suitable electrical characteristic of the gas main can be sensed for this purpose.

The valve control means 36 and such joint sensing device 37 are shown at the front end of the nozzle means in FIG. 2. However, these elements can be mounted in any other suitable location, for example, at the rear of the nozzle means, if desired.

As shown in FIG. 2, the valve control device 36 and the joint sensing device 37 are mounted in a housing 38 which is secured to the front surface of the splash plate 35 and the aforementioned eye 29 in turn is secured to the front of the housing 38.

The hose 23 in the form shown is wound upon a rotatable reel 39, the liquid sealant being fed to the hose in a conventional manner via a connection 40 at the center of the reel and from a tank 41 via a conduit 42 in which is interposed a pump 43 which is driven by a motor 44.

The snake line 24 analogously and advantageously is wound upon a reel 45 which is mounted in suitable bearings and rotatable by means of a power source, such as electrical motor 46.

The joint sensing device 37 and the valve control means 36 receive electrical energy via an electrical conduit 49 which is connected to a suitable source (not shown) of electrical energy. As shown in FIG. 1, the electrical conduit 49 enters the gas main 11 via the gland 25 and the sleeve 21 and may be secured to the hose 23 along its length, if desired.

In operation, after the excavations 17 and 18 are made and, as aforementioned, the snake line 24 has passed through the gland 26 and the sleeve 22 and the hook 27 on the forward extremity thereof is worked up to a position near the sleeve 21 where it is fished out of the gas main and the hook 27 attached to the eye 29, the nozzle means 28 are thrust into the gas main 11 via the gland 25 and the sleeve 21, if desired, with the aid of a pulling force acting upon the snake line 24. The bristle-like fingers 31—33 fold back upon the nozzle 30 to permit the passage thereof through the sleeve 21 and after the nozzle means have passed the sleeve 21, the fingers 31—33 spring outwardly substantially to the position shown in FIG. 2 thereby to hold the end of the nozzle 30 off of the bottom surface of the gas main. The reel 45 of the snake line is rotated to pull the nozzle means through the gas main section 10 while a substantial pressure of the liquid sealant, for example, in the neighborhood of 30 to 40 p.s.i., is maintained in the hose and nozzle means 23 and 28, respectively. When the nozzle means approaches a joint, such as 12, the electrical sensing device 37 is actuated thereby in turn actuating the element 36 to open the nozzle 30 via the orifice control means 34 and the liquid sealant is discharged onto the splash plate 35 and thence onto the interior surface of the gas main while the nozzle is in the neighborhood thereof. Thus the liquid sealant is introduced in the form of a spray to coat the interior of the gas main commencing at a point somewhat in advance of the joint and terminating at a point a selected distance past such joint. Thus a film of selected length is deposited on the interior of the gas main extending a selected distance on either side of each joint. The nozzle is closed while it is not in the neighborhood of a joint.

However, if desired, in another and non-analogous form of the invention, the nozzle means 28 can be kept open continuously instead of intermittently as aforementioned thereby to spray the interior surface of the length 10 throughout its length rather than at and on either side of each joint.

In the carrying out of the present method and in the operation of the apparatus embodying the invention, the nozzle means can be slowed down or stopped as it passes each joint for the purpose of ensuring that a thorough application of the liquid is made to the interior of the pipe in the neighborhood of such joint.

The present invention has the substantial advantage of being capable of sealing leaking pipe joints despite the fact that some or all of the jute packing thereof has been destroyed as by drying out, powdering and being carried away. In a pipe line system having such jute packed joints there will, of course, be many joints with varying percentages of loss of jute. Additionally, it is not necessary to fill a selected length of pipe or gas main with the sealant liquid as employed herein and to exert pressure thereupon for the purpose of penetration into the jute thereby to seal leaks, it being only necessary to introduce the sealant liquid in the form of a spray or to splatter same adequately upon the desired surfaces for the purpose of applying the aforementioned coat or film which when dry will make the desired seal. Thus where a leak exists in a joint, that is, where a joint is not fully closed by the packing but is slightly open, the sealant by means of the present invention is capable of being urged into the opening in the jute and to seal same. If, for example, almost all, say 90%, of the jute has been destroyed, the joint can be adquately sealed by the present invention by applying a suitable coating to what is left of such packing, for example, to the concrete or lead residual packing, the same being true if all of the jute has been destroyed. Thus the introduction of such spray or splattering of the liquid sealant is somewhat analogous to painting the surfaces with the substance by means of a brush and, even if the joint is bare of jute, the remaining packing surfaces consisting of lead or cement will be covered by a uniform film which is stretchable and flexible and thus which will accommodate any future movement of the joint thereby not to disturb the tightness of the seal.

The method and apparatus embodying the present invention are particularly well adapted for sealing leaks in gas mains in conventional low pressure gas distribution systems, for example, under pressure of the order of 5 to 10 inches of water column, and particularly where an adequate seal can be effected by splattering or spraying a liquid sealant of the above character upon the interior of the pipe in the neighborhood of each joint.

Furthermore, with respect to low pressure gas mains, the present invention is particularly well adapted because the drilling of the above-mentioned holes for the introduction of the snake line and the nozzle means does not involve any substantial problems of gas leakage and, as aforementioned, does not involve the stoppage of the flow of gas and thus does not interrupt gas service to customers. Any kind of loose packing can be effectively used from holes 19 and 20; and to prevent the leakage of the gas. If desired, such holes can be drilled through an opening in a valve which is temporarily fixed in place for this purpose. That is, the hole is drilled via the open valve and when the hole is made the valve can be closed until it is desired to insert the snake line or the hose means.

A sealant may be employed such as that used in copending patent application of Constantine P. Xenis and Julio Russo Serial No. 687,829, filed October 2, 1957 and entitled, Method and Apparatus for Sealing Joints in Conduit Systems, provided such sealant is aggressively adhesive.

The sealant substance in such copending patent application is a suspension of solids.

Further with respect to the motion of the nozzle means, it is possible to reciprocate the nozzle means back and forth in the neighborhood of each joint by pulling on the snake line in one direction and thereafter pulling on the hose in the other direction.

The consistency of the liquid sealant employed herein is such that if directed into a service outlet it will drain back into the main pipe and will not clog such outlet.

Furthermore, the character of the sealant employed herein should be such that the gas under pressure in the gas main will tend to push such liquid further into the joint. Thus there is a coaction between the fluid under pressure in the main and the sealant. Such pushing of the liquid sealant into the joint is accomplished regardless of the amount of destruction of the jute. Such sealant as contemplated herein should have sufficient body such that the help it obtains from the gas in pushing it through a leaking joint is advantageous, in some cases the gas pressure urging the liquid sealant into contact with the lead or cement packing, this being advantageous to the sealing of a leaking joint as opposed to certain prior art which depends solely upon the presence of jute for the purpose of effecting a seal. A sealant substance as herein contemplated will attach itself as aforementioned to all surfaces and hence to all cavities and is capable of plugging or sealing the latter. Thus, the present invention is capable of installing a permanent plug or seal in the leakage paths, that is, a seal is effected comprising a plug of material comprising the dried sealant and thus wherever the substance comes in contact with the joint surface, whether jute is present or not, a seal will be effected.

What is claimed is:

In apparatus for sealing leaks in the joints of a length of buried gas conduit having exposed opposite extremities formed with openings therein, which apparatus includes nozzle means for insertion into the conduit via one of said openings, a tank for containing a sealant, hose means for placing in communication the aforementioned nozzle means and said tank, pump means for pumping such sealant from the tank to the nozzle means, pulling means for connection to said nozzle means to advance same through said length of gas conduit, and means for actuating said pumping means to maintain said sealant under pressure, the improvement which comprises: detecting means positioned in advance of said nozzle means in the direction of movement thereof through the conduit for detecting the presence of a joint in the conduit as the apparatus advances therein, valve means normally maintaining the nozzle means closed and responsive to said detecting means upon detection of the presence of a joint to open said nozzle means, and a splash plate having a flat surface disposed in a plane perpendicular to the direction of flow of fluid issuing from said nozzle means and facing said nozzle means to direct sealant issuing therefrom onto the interior of said conduit when said nozzle is opened.

References Cited in the file of this patent

UNITED STATES PATENTS

| | | |
|---|---|---|
| 1,736,293 | Van Denburg | Nov. 19, 1929 |
| 1,951,221 | Tate | Mar. 13, 1934 |
| 2,091,544 | Hitz | Aug. 31, 1937 |
| 2,094,692 | Hitz | Oct. 5, 1937 |
| 2,739,424 | Fritze | Mar. 27, 1956 |
| 2,743,743 | Galloup | May 1, 1956 |
| 2,758,917 | Popp | Aug. 14, 1956 |
| 2,894,539 | Cook et al. | July 14, 1959 |

FOREIGN PATENTS

| | | |
|---|---|---|
| 159,598 | Australia | Nov. 3, 1954 |

OTHER REFERENCES

India Rubber World, vol. 102, No. 1, pages 43–45, April 1, 1940.